United States Patent
Lai (10) Patent No.: US 10,152,447 B2
(45) Date of Patent: Dec. 11, 2018

(54) UNIVERSAL SERIAL BUS CONVERTER CIRCUIT AND RELATED METHOD

(71) Applicant: Realtek Semiconductor Corp., HsinChu (TW)

(72) Inventor: Chao-Min Lai, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 203 days.

(21) Appl. No.: 15/209,764

(22) Filed: Jul. 14, 2016

(65) Prior Publication Data

US 2017/0161227 A1    Jun. 8, 2017

(30) Foreign Application Priority Data

Dec. 3, 2015  (TW) .............................. 104140439 A (51) Int. Cl.
| | | |
|---|---|---|
| H05K 7/10 | (2006.01) | |
| G06F 13/42 | (2006.01) | |
| G06F 13/40 | (2006.01) | |
| H04B 1/40 | (2015.01) | |

(52) U.S. Cl.
CPC ...... *G06F 13/4282* (2013.01); *G06F 13/4081* (2013.01); *H04B 1/40* (2013.01)

(58) Field of Classification Search
CPC .... G06F 13/4282; G06F 13/4081; H04B 1/40
USPC ...................................................... 710/302
See application file for complete search history.

(56) References Cited

U.S. PATENT DOCUMENTS 9,467,731 B2 * 10/2016 Zhang ............... H04M 1/72519
9,767,060 B2 *  9/2017 Talmola ............... G06F 13/4027

FOREIGN PATENT DOCUMENTS

| CN | 104065907 | 9/2014 |
| TW | 201237768 A1 | 9/2012 |

OTHER PUBLICATIONS

"Universal Serial Bus Type-C Cable and Connector Specification", Aug. 11, 2014, Revision 1.0, pp. 1, 21, 56-57, 101, and 104-106 (Year: 2014).*

* cited by examiner

*Primary Examiner* — Chun Kuan Lee
(74) *Attorney, Agent, or Firm* — Winston Hsu (57) ABSTRACT

A Universal Serial Bus (USB) converter circuit includes: a High Definition Multimedia Interface (HDMI) transceiver circuit, a signal converting circuit and a USB receptacle, wherein the HDMI transceiver circuit arranged to transmit/receive a HDMI signal, wherein the HDMI transceiver circuit includes at least a video signal and a plurality of processing signals; the signal converting circuit coupled to the HDMI transceiver circuit is arranged to execute a converting operation to processing a conversion between the plurality of processing signals and A USB signal; and the USB receptacle coupled to the signal converting circuit includes a USB signal pin and a set of video signal pin, wherein the USB signal is transmitted/received with an electronic device through the USB pin, and the video signal is transmitted/received with the electronic device through the set of video signal pin.

9 Claims, 6 Drawing Sheets

UNIVERSAL SERIAL BUS CONVERTER CIRCUIT AND RELATED METHOD

BACKGROUND OF THE INVENTION

1. Field of the Invention

The present invention relates to a Universal Serial Bus (USB) converter circuit, and more particularly, to a USB C-type interface—High Definition Multimedia Interface (HDMI) converter circuit and a related method.

2. Description of the Prior Art

Video Electronic Standard Association (VESA) proposed an USB type C—DP Alt mode for the USB type C interface being capable of supporting a display interface standard DisplayPort (DP) signal. However, considering that video devices, e.g. TV, Set Top Box (STB), etc. mainly support HDMI signal, there are some issues need to be overcame in order to implement the USB type C—HDMI converter circuit. For example, a simple USB type C—HDMI converter is not able to supply power and needs an extra converter for converting the HDMI signal to DP signal first, in which the transmitted/received data is no longer the original HDMI data. In addition, if the function of supplying power is required, devices need to convert the HDMI data to DP first then acquire the USB Power Delivery 2.0 function by the USB type C—DP Alt mode. Such implement needs two DP—HDMI converters results in the greatly increased manufacturing cost. Comparing to DP, HDMI further has few more signals such like Consumer Electronic Control (CEC) signal, Hot Plug Detection (HPD) signal and 5 volts signal, etc. Therefore, these problems need to be solved so the USB type C interface—HDMI conversion can be achieved.

SUMMARY OF THE INVENTION

The present invention discloses a USB type C interface—HDMI converter and a related converting method to solve the aforementioned problem.

According to an embodiment of the present invention, a USB converter circuit is disclosed, wherein the USB converter circuit comprises: a HDMI transceiver circuit, a signal converting circuit and a USB receptacle. The HDMI transceiver circuit is arranged to transmit/receive a HDMI signal, wherein the HDMI signal comprises at least a video signal and a plurality of processing signal; the signal converting circuit coupled to the HDMI transceiver circuit is arranged to execute a converting operation to process a conversion between the plurality of processing signals and a USB signal; and the USB receptacle coupled to the signal converting circuit comprises a USB signal pin and a set of video signal pin, wherein the USB signal is transmitted/received with an electronic device through the USB signal pin, and the video signal is transmitted/received with the electronic device through the set of video signal pin.

According to an embodiment of the present invention, a signal converting and transmitting method is disclosed, wherein the method comprises: transmitting/receiving a HDMI signal, wherein the HDMI signal comprises at least a video signal and a plurality of processing signals; executing a converting operation to process a conversion between the plurality of processing signals and a USB signal; and utilizing a USB receptacle which comprises a USB signal pin and a set of video signal pin, wherein the USB signal pin is transmitted/received with an electronic device through the USB signal pin, and the video signal is transmitted/received with the electronic device through the set of video signal pin.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
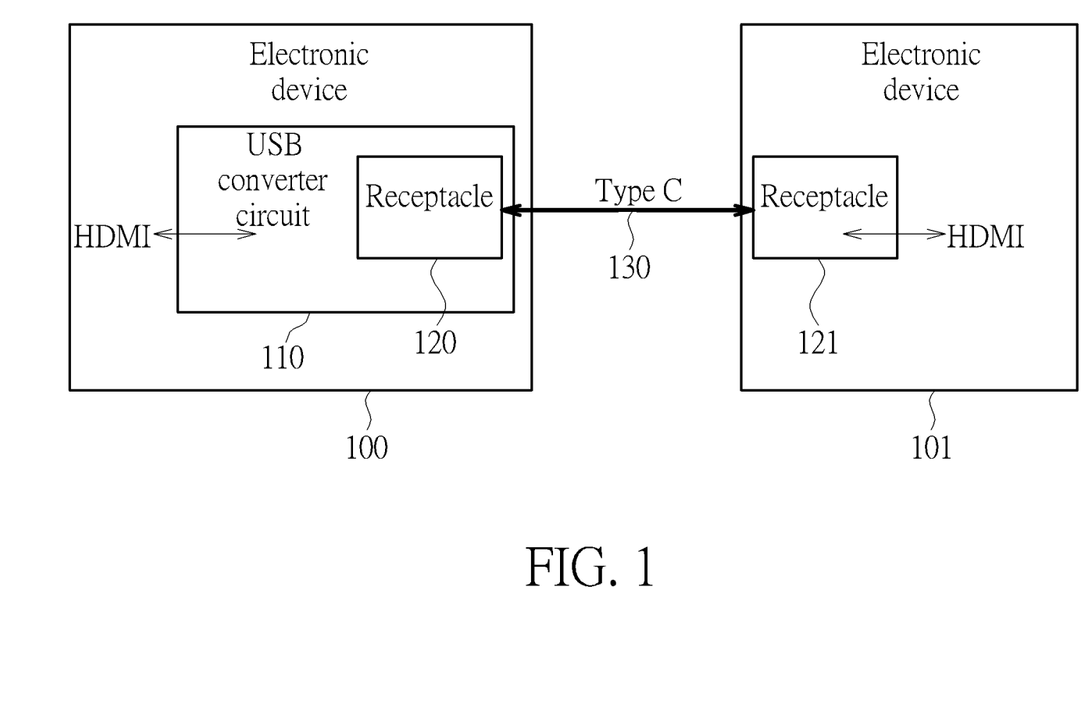
FIG. 1 is a diagram illustrating an electronic device which comprises a USB converter circuit according to an embodiment of the present invention.

FIG. 1 is a diagram illustrating an electronic device 100 which comprises a USB converter circuit 110 according to an embodiment of the present invention. As shown in FIG. 1, the USB converter circuit 110 installed in the electronic device 100 comprises a receptacle 120, wherein the receptacle 120 is a USB type C interface receptacle, and the electronic device 100 connects with an electronic device 101 via a USB type C interface cable 130 through the receptacle 120. Similarly, the electronic device 101 comprises a receptacle 121, wherein the receptacle 121 is also a USB type C interface receptacle. In this embodiment, the electronic device 100 can be a TV or a USB C-type interface—HDMI converter, and the electronic device 101 can be a Set Top Box (STB), an Over The Top Box (OTT Box), etc. As shown in FIG. 1, the USB converter circuit 110 of the present invention can transmit the HDMI signal only via one USB type C interface cable without a USB type C—DP convert as a medium. The detailed architecture of the USB converting circuit 110 will be explained in the following paragraphs.

Figure 2:
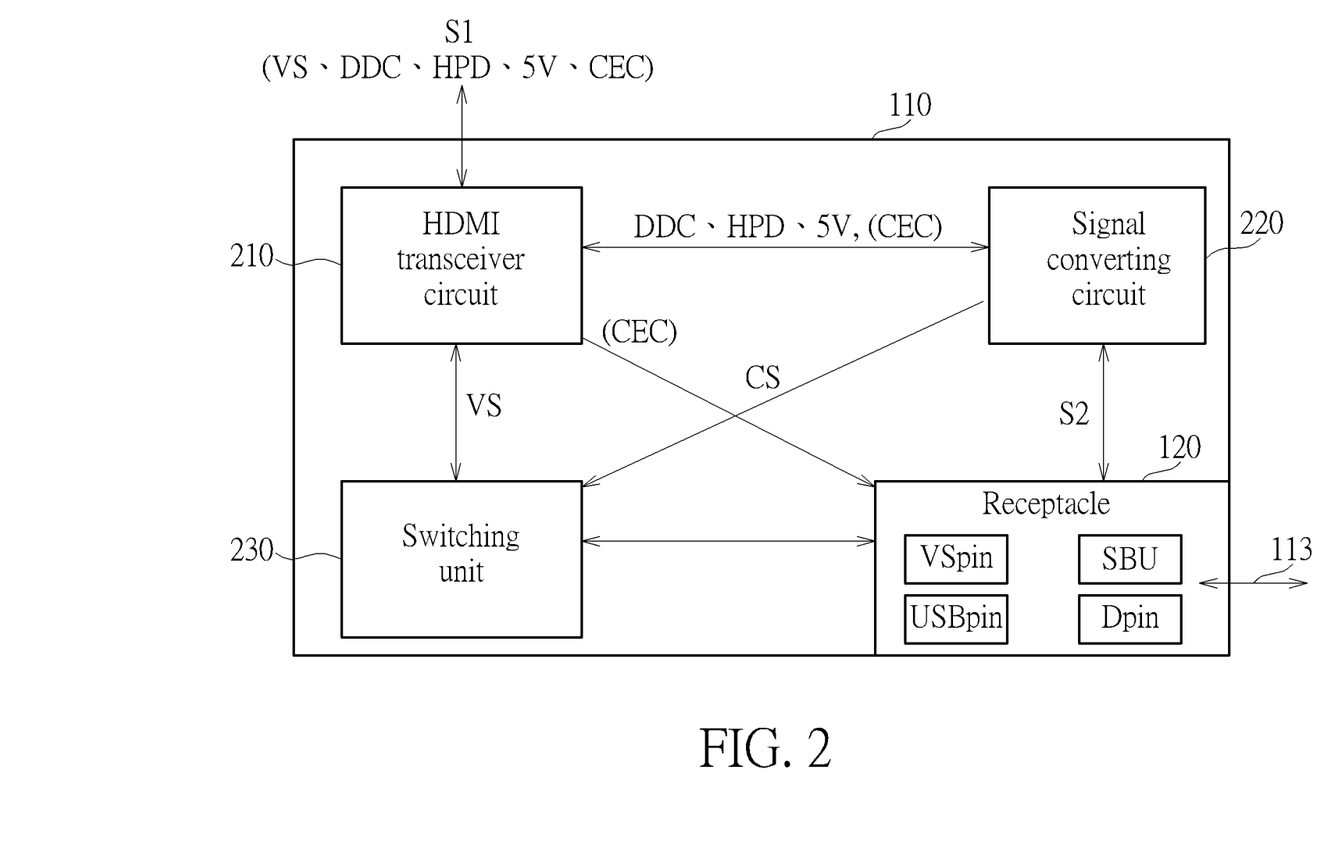
FIG. 2 is diagram illustrating a USB converter circuit according to an embodiment of the present invention.

FIG. 2 is a diagram illustrating USB converter circuit 110 according to an embodiment of the present invention. As shown in FIG. 2, except the receptacle 120 shown in FIG. 1, the USB converter circuit 110 further comprises a HDMI transceiver circuit 210, a signal converting circuit 220 and a switching unit 230, wherein the HDMI transceiver circuit 210 is arranged to transmit/receive a HDMI signal S1 which comprises a HDMI video signal VS and a plurality of processing signals. In this embodiment, the plurality of processing signals comprise at least a Display Data Channel (DDC) signal, a Hot Plug Detection (HPD) signal, and a 5 volts voltage signal. The signal converting circuit 220 is arranged to convert the plurality of processing signals (DDC, HPD and 5 volts voltage signal) to a signal S2, wherein the signal S2 corresponds to the USB 2.0 standard and is transmitted/received through a set of USB 2.0 pin USBpin of the receptacle 120 while the video signal VS comprised in the HDMI signal S1 is transmitted/received through a set of video pin VSpin. It should be noted that the transmission/reception of the video signal VS is conducted through two pairs of transceiver pins of a USB type C receptacle, that is, the video pin VSpin has four pairs of pins. In addition, the HDMI signal S1 further comprises a Consumer Electronics Control (CEC) signal. In an embodiment, the CEC signal is transmitted/received through a SideBand Use (SBU) pin of the receptacle 120. However, it should not be a limitation of the present invention. In another embodiment, the CEC signal, the DDC signal, the HPD signal and the 5 volts voltage signal can be converted to the signal S2 by the signal converting circuit 220 together then be transmitted/received through the USB2.0 pin. It should be noted that the connection between the USB type C receptacle and the USB type C interface cable allows reversible plug orientation, which means that the connection can be implemented in a first connecting way (which is the non-reverse plug orientation in this embodiment) or a second connecting way (which is the reverse plug orientation in this embodiment). Therefore, the receptacle 120 further comprises a detecting pin CC to detect the current connection between the USB type C receptacle and the USB type C interface cable is either in the first connecting way (non-reverse plug orientation) or the second connecting way (reverse plug orientation). When the connection is in the second connecting way (reverse plug orientation), the signal converting circuit 220 transmits a control signal CS to the switching unit 230 to make sure the correctness of the video signal VS. The detailed description will be explained in the following paragraphs.

Figure 3:
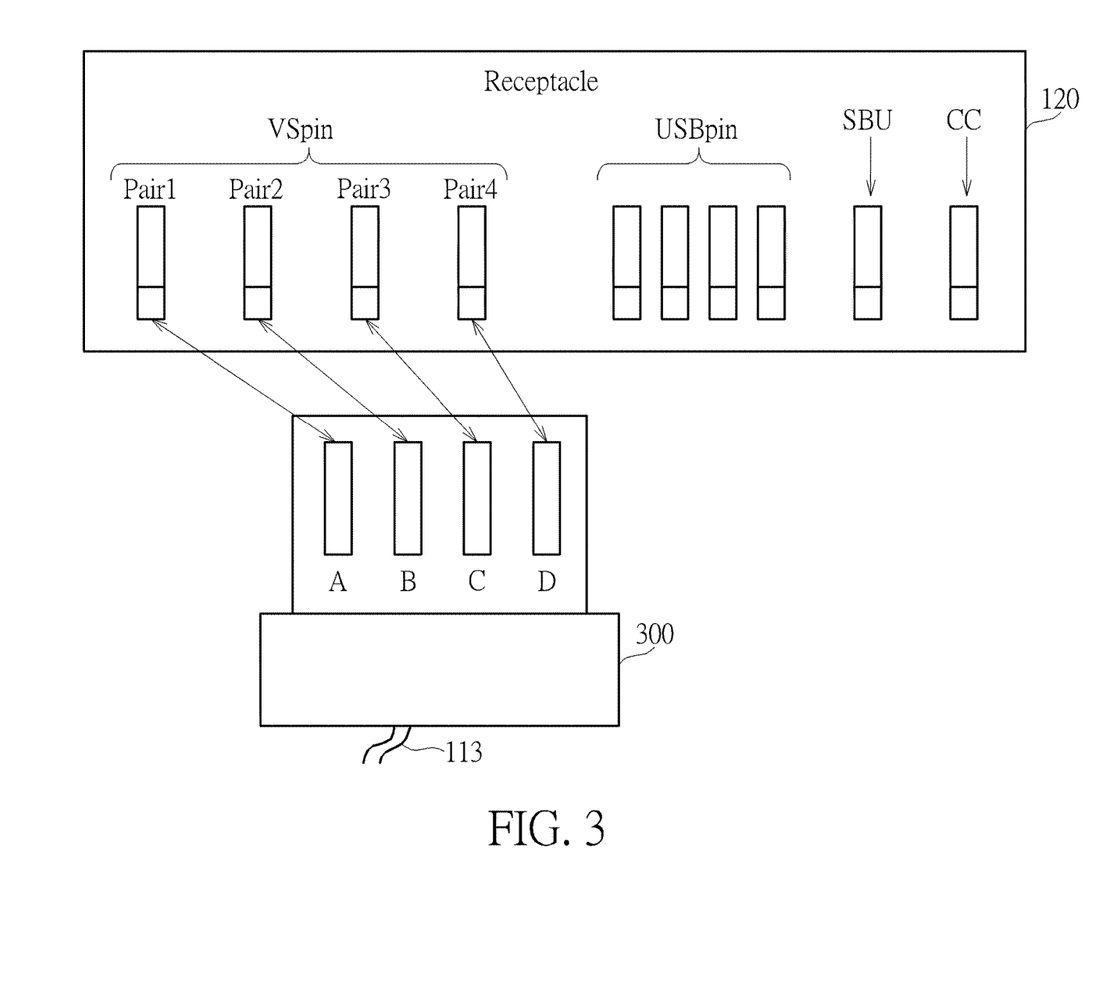
FIG. 3 is a diagram illustrating a first connecting way according to an embodiment of the present invention.
Figure 4:
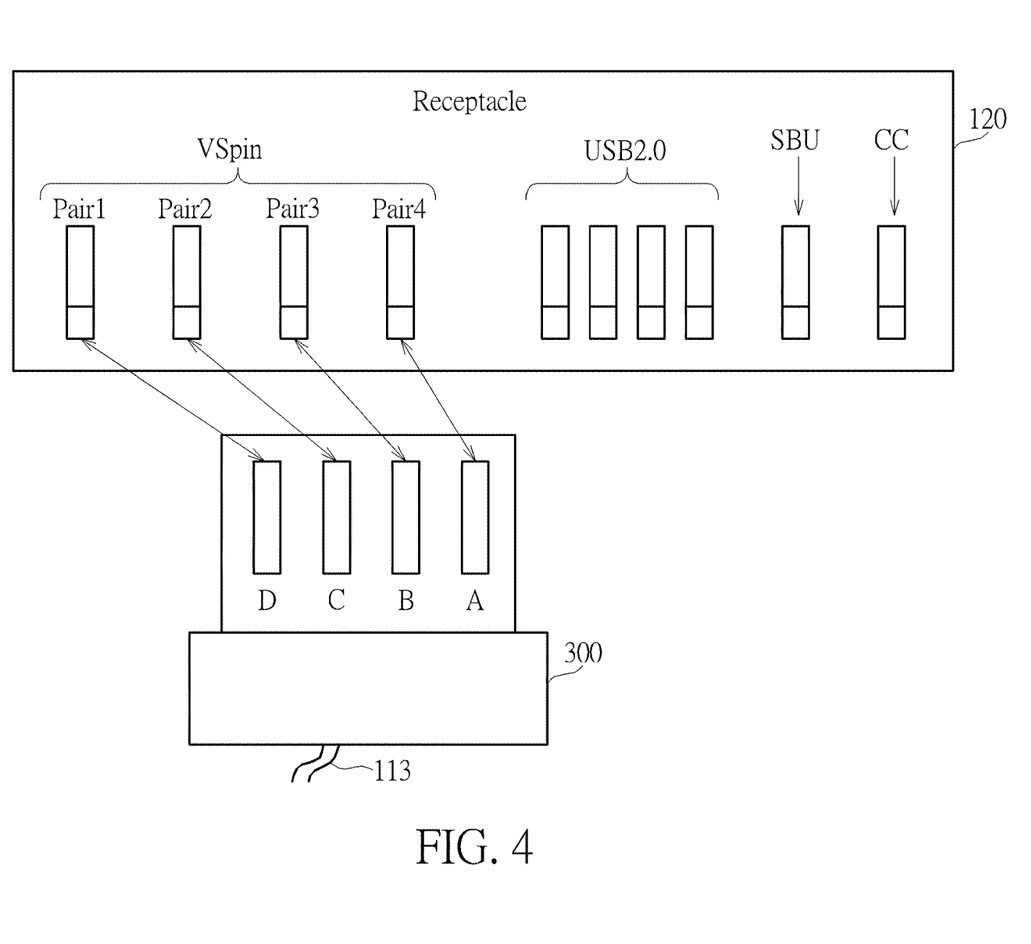
FIG. 4 is a diagram illustrating a second connecting way according to an embodiment of the present invention.

FIG. 3 is a diagram illustrating a first connecting way (non-reverse plug orientation) according to an embodiment of the present invention, wherein the video pin VSpin of the receptacle 120 comprises pins Pair1, Pair2, Pair3 and Pair4. It should be noted that the locations of the video pin VSpin, the USB 2.0 pin USBpin and SBU pin and the relative locations between each pin shown in FIG. 3 are only for illustrative purpose, not a limitation of the present invention. Besides, the receptacle 120 comprises not only those pins shown in FIG. 3. The skilled person in the art should understand the number, the locations and the purposes of pins comprised in a USB type C receptacle. The USB type C interface cable 113 is attached by a connector 300 corresponding to the USB type C interface, wherein the number of slots of the connector 300 shown in FIG. 3 is only for illustrative purpose, not a limitation of the present invention. In addition, the connector 300 comprises not only those slots shown in FIG. 3. The skilled person in the art should understand the number and the purposes of slots of a connector corresponding to the USB type C interface. When the receptacle 120 and the connector 300 are connected in the first connecting way (non-reverse plug orientation), the slot A is going to be coupled to the pin Pair1, the slot B is going to be coupled to the pin Pair2, the slot C is going to be coupled to the pin Pair3 and the slot D is going to be coupled to the pin Pair4. FIG. 4 is a diagram illustrating a second connecting way according to an embodiment of the present invention. When the receptacle 120 and the connector 300 are connected in the second connecting way (reverse plug orientation), the slot D is going to be coupled to the pin Pair1, the slot C is going to be coupled to the pin Pair2, the slot B is going to be coupled to the pin Pair3 and the slot A is going to be coupled to the pin Pair4.

Figure 5:
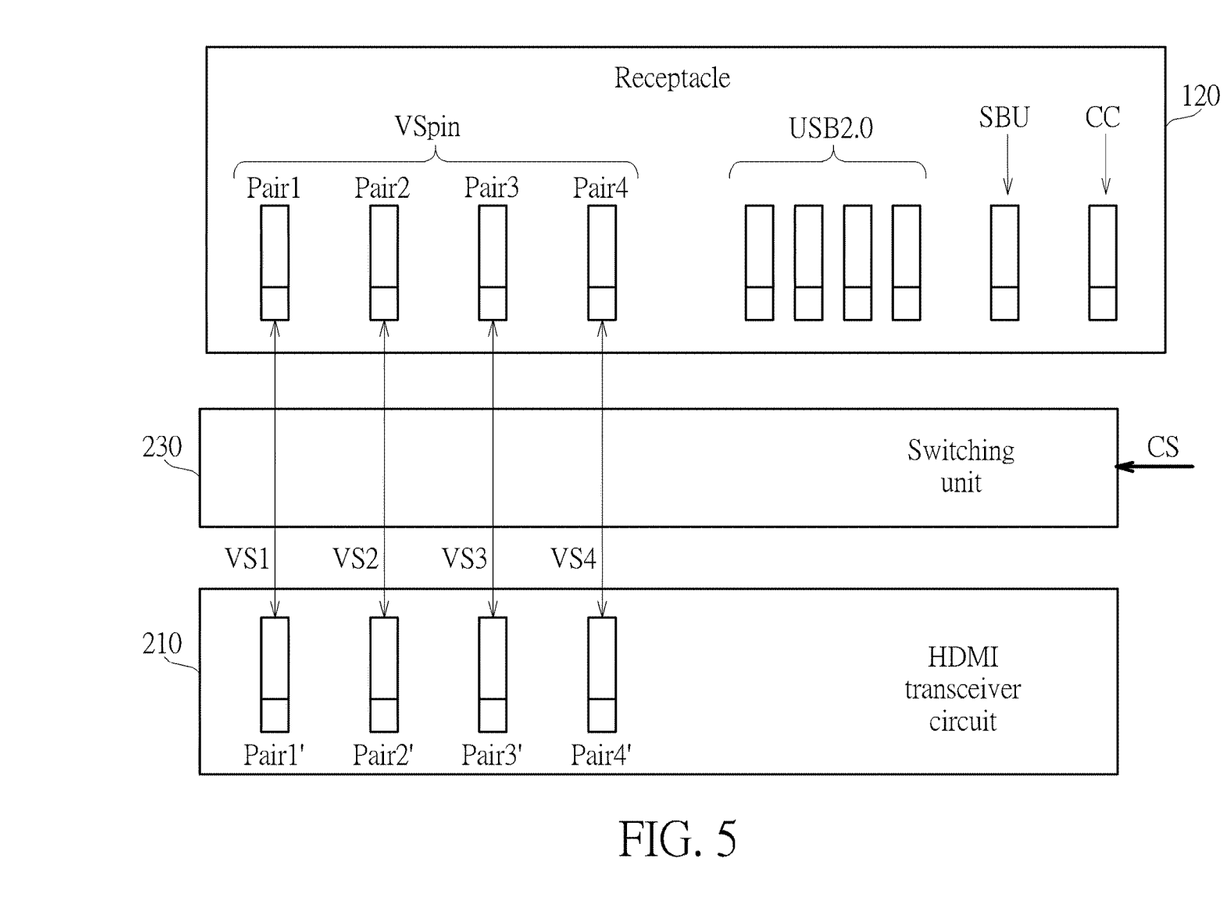
FIG. 5 is a diagram illustrating a switching unit operating in the first connecting way according to an embodiment of the present invention.
Figure 6:
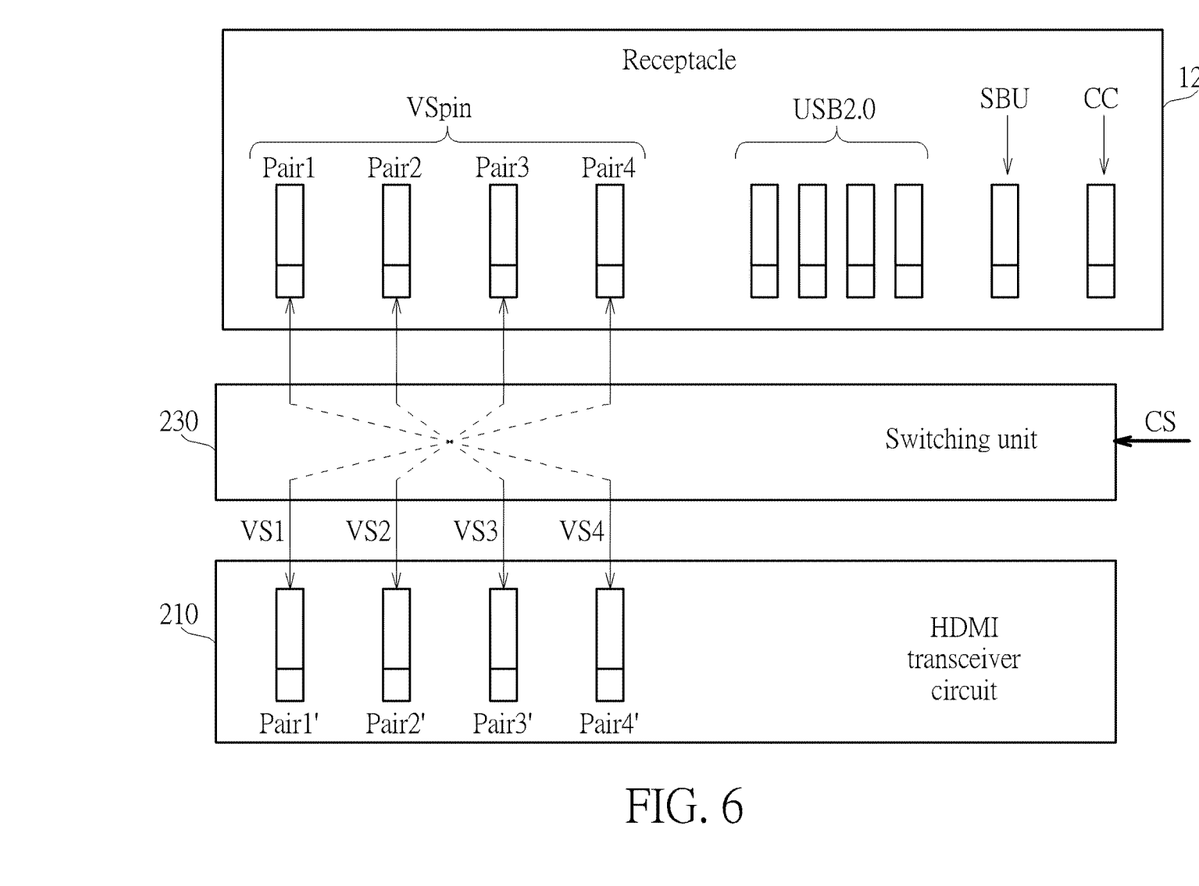
FIG. 6 is a diagram illustrating a switching unit operating in the second connecting way according to an embodiment of the present invention.

FIG. 5 is a diagram illustrating a switching unit 230 operating in the first connecting way according to an embodiment of the present invention. As shown in FIG. 5, the HDMI transceiver circuit 210 comprises corresponding pins Pair1', Pair2', Pair3' and Pair4', wherein the corresponding pin Pair1' is arranged to receive a first part VS1 of the video signal VS, the corresponding pin Pair2' is arranged to receive a second part VS2 of the video signal VS, the corresponding pin Pair3' is arranged to receive a third part VS3 of the video signal VS, and the corresponding pin Pair4' is arranged to receive a fourth part VS4 of the video signal VS. When the detecting pin CC detects the connection between the connector 300 and the receptacle 120 is in the first connecting way (non-reverse plug orientation), according to the control CS sent by the signal converting circuit 220, the switching unit 230 couples the pin Pair1 of the video pin VSpin to the corresponding pin Pair1' of the HDMI transceiver circuit 210 to transmit/receive the first part VS1 of the video signal VS, couples the pin Pair2 of the video pin VSpin to the corresponding pin Pair2' of the HDMI transceiver circuit 210 to transmit/receive the first part VS2 of the video signal VS, couples the pin Pair3 of the video pin VSpin to the corresponding pin Pair3' of the HDMI transceiver circuit 210 to transmit/receive the first part VS3 of the video signal VS, and couples the pin Pair4 of the video pin VSpin to the corresponding pin Pair4' of the HDMI transceiver circuit 210 to transmit/receive the first part VS4 of the video signal VS. It should be noted that the HDMI transceiver circuit 210 comprises not only the corresponding pins Pair1' to Pair4'. It is only for illustrative purpose. The skilled person in the art should understand the other pins comprised in HDMI transceiver circuit 210 and its purposes. FIG. 6 is a diagram illustrating a switching unit 230 operating in the second connecting way according to an embodiment of the present invention. When the detecting pin CC detects the connection between the connector 300 and the receptacle 120 is in the second connecting way, according to the control signal CS sent by the signal converting circuit 220, the switching unit 230 couples the pin Pair4 of the video pin VSpin to the corresponding pin Pair1' of the HDMI transceiver circuit 210 to transmit/receive the first part VS1 of the video signal VS, couples the pin Pair3 of the video pin VSpin to the corresponding pin Pair2' of the HDMI transceiver circuit 210 to transmit/receive the second part VS2 of the video signal VS, couples the pin Pair2 of the video pin VSpin to the corresponding pin Pair3' of the HDMI transceiver circuit 210 to transmit/receive the third part VS3 of the video signal VS, and couples the pin Pair1 of the video pin VSpin to the corresponding pin Pair4' of the HDMI transceiver circuit 210 to transmit/receive the fourth part VS4 of the video signal VS. In an embodiment, the switching unit 230 utilizes switches to switch the connecting path between pins Pair1-Pair4 to corresponding pins Pair1'-Pair4'. However, it is only for illustrative purpose, not a limitation of the present invention. In other words, the present invention does not limit the implement of the switching unit 230. In addition, in an embodiment, the switching 230 is implemented outside the HDMI transceiver circuit 210 and the receptacle 120, that is, the switching unit 230 can be solely implemented in an integrated circuit. In another embodiment, the switching unit 230 can be implemented in the HDMI transceiver circuit 210 or the receptacle 120. It shall fall within the scope of the present invention as long as the circuit is capable of switching the connecting path between the pins Pair1-Pair 4 to the corresponding pins Pair1 '-Pair4'.

Briefly summarized, the present invention discloses a USB type C—HDMI converter circuit. By converting a plurality of processing signals (e.g. DDC, HPD, 5 volts voltage signal) to a signal corresponding to USB 2.0 standard, the HDMI signal can be transmitted with another electronic device only via a USB type C interface cable, and also the electronic device can be charged at the same time due to the characteristic of USB type C interface cable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Universal Serial Bus (USB) converter circuit, comprising:
   a High Definition Multimedia Interface (HDMI) transceiver circuit, arranged to transmit/receive a HDMI signal, wherein the HDMI signal comprises a video signal, a plurality of processing signals, a first corresponding pin arranged to transmit/receive a first part of the video signal, a second corresponding pin arranged to transmit/receive a second part of the video signal, a third corresponding pin arranged to transmit/receive a third part of the video signal, and a fourth corresponding pin arranged to transmit/receive a fourth part of the video signal;
   a signal converting circuit, coupled to the HDMI transceiver circuit, wherein the signal converting circuit is arranged to execute a converting operation to processing a conversion between the plurality of processing signals and a USB signal;
   a USB receptacle coupled to the signal converting circuit and comprising a USB signal pin and a set of video signal pin comprising a first pin, a second pin, a third pin and a fourth pin, wherein the USB signal is transmitted/received with an electronic device through the USB signal pin, and the video signal is transmitted/received with the electronic device through the set of video signal pin, and the USB receptacle is further arranged to detect a connection between the USB receptacle and a USB cable is either in a first connecting way or in a second connecting way, wherein the USB cable is connected between the electronic device and the USB receptacle; and
   a switching unit, coupled to the HDMI transceiver circuit and the USB receptacle, wherein the switching unit is arranged to selectively switch connections of the video signal and the set of video signal pin;
   wherein when the USB receptacle detects the connection between the USB cable and the USB receptacle is in the second connecting way, the switching unit controls the first part of the video signal to be transmitted/received with the HDMI transceiver circuit through the fourth pin of the set of video signal pin, controls the second part of the video signal to be transmitted/received with the HDMI transceiver circuit through the third pin of the set of video signal pin, controls the third part of the video signal to be transmitted/received with the HDMI transceiver circuit through the second pin of the set of video signal pin, and controls the fourth part of the video signal to be transmitted/received with the HDMI transceiver circuit through the first pin of the set of video signal pin; and when the USB receptacle detects the connection between the USB cable and the USB receptacle is in the first connecting way, the switching unit controls the first part of the video signal to be transmitted/received with the HDMI transceiver circuit through the first pin of the set of video signal pin, controls the second part of the video signal to be transmitted/received with the HDMI transceiver circuit through the second pin of the set of video signal pin, controls the third part of the video signal to be transmitted/received with the HDMI transceiver circuit through the third pin of the set of video signal pin, and controls the fourth part of the video signal to be transmitted/received with the HDMI transceiver circuit through the fourth pin of the set of video signal pin.

2. The USB converter circuit of claim 1, wherein the USB receptacle is a USB type C interface receptacle, which comprises a set of pins corresponding to a USB 2.0 standard, and the USB signal is corresponding to the USB 2.0 standard.

3. The USB converter circuit of claim 1, wherein the plurality of processing signals comprises at least a Display Data Channel (DDC) signal, a Hot Plug detection (HPD) signal and a 5 volts voltage signal.

4. The USB converter circuit of claim 1, wherein the plurality of processing signals comprises at least a Consumer Electronics Control (CEC) signal.

5. The USB converter circuit of claim 1, wherein the HDMI signal further comprises a Consumer Electronics Control (CEC) signal, and the USB receptacle further comprises a Side Band Use (SBU) pin, wherein the CEC signal is transmitted/received with the electronic device through the SBU pin.

6. A signal converting and transmitting method, comprising:
   transmitting/receiving a High Definition Multimedia Interface (HDMI) signal, wherein the HDMI signal comprises at least a video signal, a plurality of processing signals, a first corresponding pin arranged to transmit/receive a first part of the video signal, a second corresponding pin arranged to transmit/receive a second part of the video signal, a third corresponding pin arranged to transmit/receive a third part of the video signal, and a fourth corresponding pin arranged to transmit/receive a fourth part of the video signal;
   executing a converting operation to process a conversion of the plurality of processing signals and a Universal Serial Bus (USB) signal;
   utilizing a USB receptacle which comprises a USB signal pin and a set of video signal pin comprising a first pin, a second pin, a third pin and a fourth pin, wherein the video signal is transmitted/received with an electronic device through the set of video signal pin, to detect a connection between the USB receptacle and a USB cable is either in a first connecting way or in a second connecting way, wherein the USB cable is connected between the electronic device and the USB receptacle; and
   selectively switching connections of the video signal and the set of video signal pin;
   wherein when the USB receptacle detects the connection between the USB cable and the USB receptacle is in the second connecting way, controlling the first part of the video signal to be transmitted/received through the fourth pin of the set of video signal pin, controlling the second part of the video signal to be transmitted/received through the third pin of the set of video signal pin, controlling the third part of the video signal to be transmitted/received through the second pin of the set of video signal pin, and controlling the fourth part of the video signal to be transmitted/received through the first pin of the set of video signal pin; and when the USB receptacle detects the connection between the USB cable and the USB receptacle is in the first connecting way, controlling the first part of the video signal to be transmitted/received through the first pin of the set of video signal pin, controlling the second part of the video signal to be transmitted/received through the second pin of the set of video signal pin, controlling the third part of the video signal to be transmitted/received through the third pin of the set of video signal pin, and controlling the fourth part of the video signal to be transmitted/received through the fourth pin of the set of video signal pin.

7. The signal converting and transmitting method of claim 6, wherein the USB receptacle is a USB type C interface receptacle which comprises a set of pins corresponding to a USB 2.0 standard, and the USB signal is corresponding to the USB 2.0 standard.

8. The signal converting and transmitting method of claim 6, wherein the plurality of processing signals comprise at least a Display Data Channel (DDC) signal, a Hot Plug Detection (HPD) signal and a 5 volts voltage signal.

9. The signal converting and transmitting method of claim 6, wherein the plurality of processing signals comprise at least a Consumer Electronics Control (CEC) signal.

* * * * *